(12) United States Patent
Liu et al.

(10) Patent No.: US 6,686,019 B1
(45) Date of Patent: Feb. 3, 2004

(54) IN-SITU STABILIZATION OF COMPOSITE LUBRICANT/ADDITIVE FILMS ON THIN FILM MEDIA

(75) Inventors: Jianwei Liu, Fremont, CA (US); Michael Joseph Stirniman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 56 days.

(21) Appl. No.: 09/986,910

(22) Filed: Nov. 13, 2001

Related U.S. Application Data

(60) Provisional application No. 60/270,417, filed on Feb. 20, 2001.

(51) Int. Cl.$^7$ .............................. G11B 5/725; G11B 5/82
(52) U.S. Cl. ...................... 428/65.8; 428/421; 428/336; 428/694 TP; 428/694 TF; 427/130; 427/131; 427/553
(58) Field of Search ................... 428/694 TP, 694 TF, 428/65.8, 336, 421; 427/130, 131, 553

(56) References Cited

U.S. PATENT DOCUMENTS

| | | |
|---|---|---|
| 4,268,556 A | 5/1981 | Pedrotty |
| 5,030,478 A | 7/1991 | Lin et al. |
| 5,273,830 A | 12/1993 | Yaguchi et al. |
| 5,387,353 A | 2/1995 | Nader |
| 5,587,217 A | 12/1996 | Chao et al. |
| 5,698,272 A | 12/1997 | Smentkowski et al. |
| 5,718,942 A | 2/1998 | Vurens et al. |
| 5,851,601 A | 12/1998 | Mehmandoust et al. |
| 5,908,817 A | 6/1999 | Perettie et al. |
| 6,096,385 A | 8/2000 | Yong et al. |
| 6,099,762 A | 8/2000 | Lewis |
| 6,106,919 A | 8/2000 | Lee et al. |
| 6,204,504 B1 | 3/2001 | Lewis |

*Primary Examiner*—Stevan A. Resan
(74) *Attorney, Agent, or Firm*—McDermott, Will & Emery

(57) ABSTRACT

A method of in situ stabilizing a composite lubricant in order to reduce or subtantially eliminate phase separation of the components of the composite lubricant, comprising sequential steps of:

(a) providing a substrate including a surface;
(b) applying a thin layer or film of the composite lubricant to the substrate surface, the composite lubricant comprising at least two lubricant components which are normally mutually immiscible; and
(c) treating the thin layer or film of composite lubricant solely with UV radiation for an interval sufficient to reduce or substantially eliminate phase separation of the at least two normally mutually immiscible lubricant components.

Embodiments of the invention include magnetic and magneto-optical (MO) media including stabilized composite lubricant layers formed in situ according to the inventive process.

18 Claims, 2 Drawing Sheets

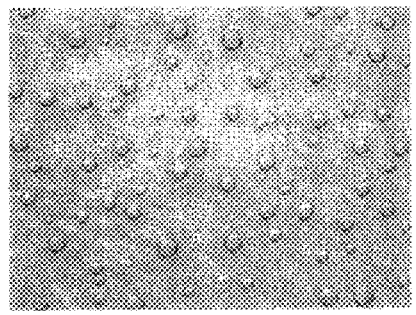
FIG. 1(A), X1P/Zdol
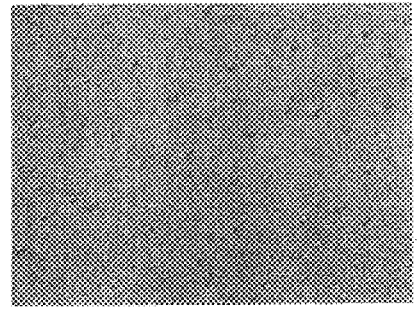
FIG. 1(B), After 2 min of UV
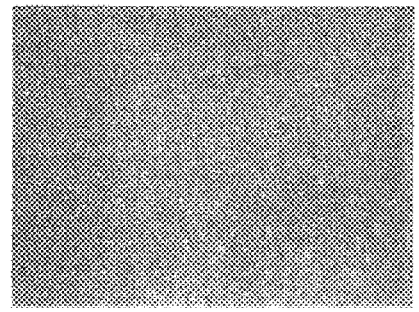
FIG. 1(C), After 4 min of UV
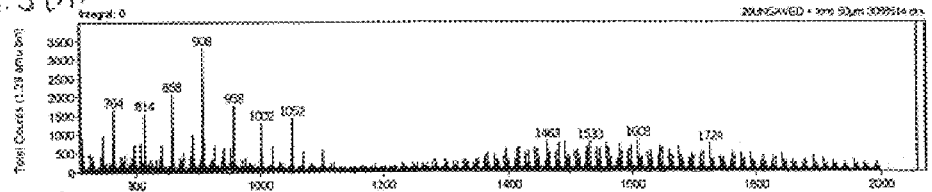
FIG. 3(A) — No UV irradiation
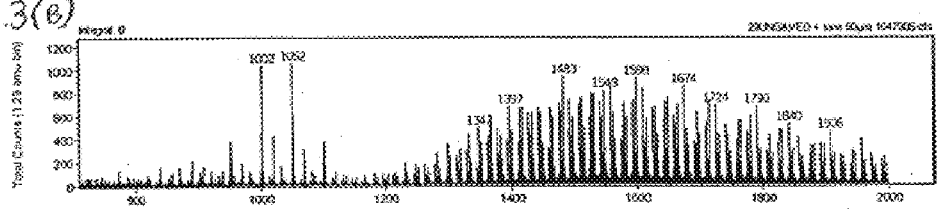
FIG. 3(B) — UV irradiation for 2 min.

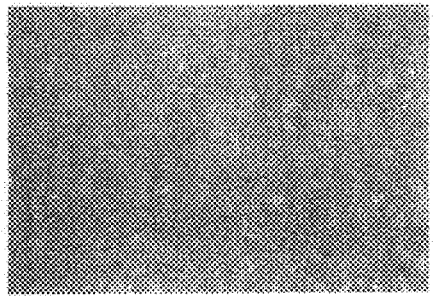

FIG. 2(A), UV irradiated X1P/Zdol after being held at ambient conditions for 4 weeks, at laser textured region

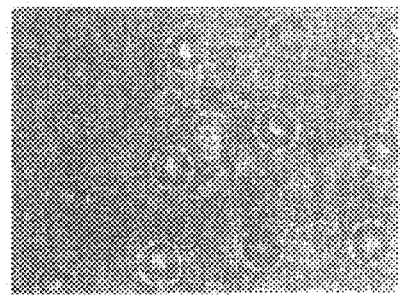

FIG. 2(B), UV irradiated X1P/Ztetraol after being held at ambient conditions for 4 weeks, at laser textured region

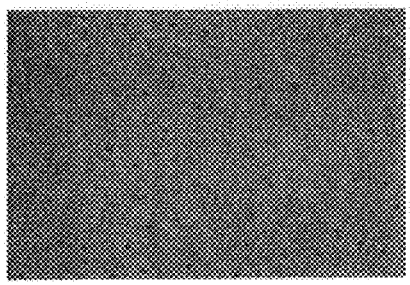

FIG. 2(C), X1P/Zdol (No UV) after being held at ambient conditions for 4 weeks, at laser textured region

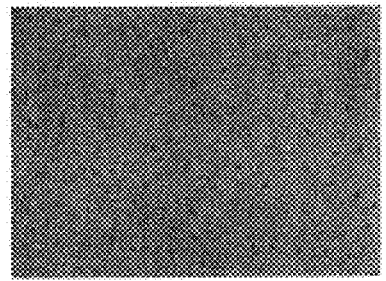

FIG. 2(D), X1P/Ztetraol (No UV) after being held at ambient conditions for 4 weeks, at laser textured region

IN-SITU STABILIZATION OF COMPOSITE LUBRICANT/ADDITIVE FILMS ON THIN FILM MEDIA

CROSS-REFERENCE TO PROVISIONAL APPLICATION

This application claims priority from U.S. provisional patent application Serial No. 60/270,417 filed Feb. 20, 2001, the entire disclosure of which is incorporated herein by reference.

FIELD OF THE INVENTION

The present invention relates to an improved method for stabilizing a thin film of a composite lubricant material applied to the surface of a thin film recording medium, particularly for reducing static and dynamic frictional coefficients thereof when utilized in combination with a flying head read/write transducer, and to improved thin film recording media obtained thereby. The invention finds particular utility in the manufacture and use of thin film type magnetic or magneto-optical ("MO") data/information storage and retrieval media comprising a layer stack or laminate of a plurality of thin film layers formed on a suitable substrate, e.g., a disk-shaped substrate, wherein a thin topcoat layer comprised of a composite lubricant material is applied to the upper surface of the layer stack or laminate for improving tribological performance of the media when utilized with read/write transducer heads operating at very low flying heights.

BACKGROUND OF THE INVENTION

Magnetic and MO media are widely employed in various applications, particularly in the computer industry for data/information storage and retrieval purposes. A magnetic medium in, e.g., disc form, such as utilized in computer-related applications, comprises a non-magnetic disk-shaped substrate, e.g., of glass, ceramic, glass-ceramic composite, polymer, metal, or metal alloy, typically an aluminum (Al)-based alloy such as aluminum-magnesium (Al—Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni—P), a polycrystalline underlayer, typically of chromium (Cr) or a Cr-based alloy such as chromium-vanadium (Cr—V), a magnetic layer, e.g., of a cobalt (Co)-based alloy, and a protective overcoat layer, typically of a carbon (C)-based material, e.g., diamond-like carbon ("DLC") having good tribological properties. A similar situation exists with MO media, wherein a layer stack or laminate is formed on a substrate deposition surface, which layer stack or laminate typically comprises a reflective layer, e.g., of a metal or metal alloy, one or more rare-earth thermo-magnetic (RE-TM) alloy layers, one or more transparent dielectric layers, and a protective overcoat layer, e.g., a DLC layer, for functioning as reflective, transparent, writing, writing assist, and read-out layers, etc.

Thin film magnetic and MO media in disk form, such as described supra, are typically lubricated with a thin topcoat film or layer comprised of a polymeric lubricant, e.g., a perfluoropolyether, to reduce wear of the disc when utilized with data/information recording and read-out transducer heads operating at low flying heights, as in a hard disk system functioning in a contact start-stop ("CSS") mode. Conventionally, the thin film of lubricant is applied to the disc surface(s) during manufacture by dipping into a bath containing a small amount of lubricant, e.g., less than about 1% by weight of a fluorine-containing polymer, dissolved in a suitable solvent, typically a perfluorocarbon, fluorohydrocarbon, or hydrofluoroether.

The lubricity properties of disk-shaped recording media are generally measured and characterized in terms of dynamic and/or static coefficients of friction. The former type, i.e., dynamic friction coefficient, is typically measured utilizing a standard drag test in which the drag produced by contact of a read/write transducer head with a disk surface is determined at a constant spin rate, e.g., 1 rpm. The latter type, i.e., static coefficients of friction (also known as "stiction" values), are typically measured utilizing a standard contact start/stop ("CSS") test in which the peak level of friction is measured as the disk starts rotating from zero (0) rpm to a selected revolution rate, e.g., 5,000 rpm. After the peak friction has been measured, the disk is brought to rest, and the start/stop process is repeated for a selected number of start/stop cycles. An important property of a disk which is required for good long-term disk and drive performance is that the disk retain a relatively low coefficient of friction after many start/stop cycles or contacts with the read/write transducer head, e.g., 20,000 start/stop cycles.

The most commonly employed lubricants utilized with thin film, disk-shaped magnetic and MO media, i.e., perfluoropolyether ("PFPE")-based lubricants, perform well under ambient conditions but not under conditions of higher temperature and high or low humidity. Studies, as described in, for example U.S. Pat. No. 5,587,217, the entire disclosure of which is incorporated herein by reference, have indicated that the tribological properties, and perhaps corrosion resistance, of perfluoropolyether-based lubricants utilized in the manufacture of thin film recording media can be substantially improved by addition thereto of an appropriate amount of a cyclotriphosphazene-based lubricant additive, e.g., a polyphenoxy cyclotriphosphazene comprising substituted or unsubstituted phenoxy groups, to form what is termed a "composite lubricant".

Currently, bis (4-fluorophenoxy)—tetrakis (3-trifluoromethyl phenoxy) cyclotriphospazene (available as X-1P™ from Dow Chemical Co., Midland, Mich.) is the lubricant most commonly with perfluoropolyether-based lubricants for forming composite lubricants for use with thin film magnetic and MO media. However, as disclosed in U.S. Pat. Nos. 5,718,942 and 5,908,817, the disclosures of which are incorporated herein by reference, the use of X-1P as a lubricant additive for forming composite lubricants comprising commonly employed perfluoropolyether-based lubricants in the data storage industry (e.g., Fomblin Z-DOL™ and Fomblin Z-TETRAOL™, each available from Ausimont, Thorofare, N.J.) incurs a disadvantage in that the former (i.e., the cyclotriphasphazene-based lubricant additive) has very low solubility in the latter (i.e., the PFPE-based primary lubricant).

For example, X-1P, in combination with Z-DOL at levels up to about 5 wt. %, reduces stiction and increases the stability of Z-DOL. However, because X-1P is virtually immiscible in PFPE-based lubricants, phase separation typically occurs at the optimal X-1P/PFPE ratios. The phase separation leads to chemical non-uniformity of the lubricant film on the media (e.g., disk) surface, as by the so-called "balling" effect, which tends to affect the tribology (i.e., durability) of the head/disk interface, particularly when the thickness of the X-1P exceeds about 1–2 Å. As a consequence of the poor compatibility of the X1P lubricant additive with the Z-DOL or Z-TETRAOL primary lubricant, the maximum amount of X1P that can used therewith is severely limited, typically to about 10% of the total lubricant thickness. Moreover, X-1P/PFPE mixtures do not exhibit performance enhancement over PFPE alone when the X-1P layer thickness is less than about 1Å, or at X-1P concentrations less than about 1 wt. %. Thus, according to current practice, the effective concentration window for use of X-1P in combination with PFPE is quite narrow, and special process control is required to achieve optimal performance. Notwithstanding such special process control, phase separation of the X-1P additive, accelerated lubricant loss, and a large amount of transducer head smear frequently occur even with such low additive contents.

U.S. Pat. No. 6,099,762, the entire disclosure of which is incorporated herein by reference, discloses a process for enhancing the bonding, thus durability, of thin lubricant layers comprised of a PFPE, a phosphazene, or both, to media surfaces by means of a process comprising exposing the lubricant layer or film to infra-red ("IR") and ultra-violet ("UV") radiation, either simultaneously or sequentially, wherein the IR radiation effects heating of the lubricant layer or film to a temperature above about 150° F. but less than about 500° F., and the UV radiation comprises a wavelength component of about 185 nm for photolytically generating ozone ($O_3$) in the vicinity of the lubricant layer or film for effecting bonding thereof to the media surface. This process for enhancing bonding of the composite lubricant films to the media surface, however, is not performed in a manner as to effect stabilization of the composite lubricant films.

In view of the above, there exists a clear need for improved methodology for applying thin films of composite lubricants to surfaces of thin film recording media, e.g., in disk form, wherein the composite lubricant films include a primary lubricant material comprised of a perfluoropolyether compound and a lubricant additive comprised of a cyclotriphosphazene derivative, which methodology overcomes the drawbacks and disadvantages of the conventional methodology described above. More specifically, there exists a need for improved methodology for applying and treating (e.g., for stabilizing with respect to phase separation) composite lubricant films comprised of a primary lubricant and a lubricant additive when utilized with disk-shaped workpieces in the manufacture of thin film magnetic and MO media.

The present invention addresses and solves problems and difficulties in achieving stabilization of high performance, composite lubricant thin films utilized in the manufacture of thin film, disk-shaped magnetic and MO data/information storage and retrieval media, wherein the composite lubricant thin films are comprised of a primary lubricant and a lubricant additive, while maintaining full compatibility with all aspects of conventional automated manufacturing technology therefor, including productivity requirements necessary for economic competitiveness. In addition, the present invention provides improved thin film magnetic and MO media having stabilized lubricant films comprised of a primary lubricant and a lubricant additive. Further, the methodology afforded by the present invention enjoys diverse utility in the manufacture of various other devices and/or article requiring formation of stable, high performance, composite lubricant thin films thereon.

DISCLOSURE OF THE INVENTION

An advantage of the present invention is an improved method for performing in situ stabilization of a composite lubricant to reduce or substantially eliminate phase separation of the components of the composite lubricant.

Another advantage of the present invention is an improved method for forming data/information storage and retrieval media comprising an in situ stabilized thin film or layer of a composite lubricant.

Still another advantage of the present invention is improved data/information storage and retrieval media comprising an in situ stabilized thin film or layer of a composite lubricant.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of performing in situ stabilization of a composite lubricant in order to reduce or substantially eliminate phase separation of the components of the composite lubricant, which method comprises the sequential steps of:

(a) providing a substrate including a surface;

(b) applying a thin layer or film of the composite lubricant to the substrate surface, the composite lubricant comprising at least two lubricant components which are normally mutually immiscible, leading to separation into individual phases over a period of time; and (c) treating the thin layer or film of composite lubricant solely with UV radiation for an interval sufficient to reduce or substantially eliminate the phase separation of the at least two normally mutually immiscible lubricant components.

According to embodiments of the present invention, step (a) comprises providing a data/information storage and retrieval medium as the substrate, e.g., in the form of a disk-shaped magnetic or magneto-optical ("MO") medium, wherein the substrate surface comprises a layer of a carbon (C)-based material; and step (b) comprises applying a thin layer or film of a composite lubricant comprising at least one perfluoropolyether compound as a primary lubricant and at least one phosphazene derivative as a lubricant additive, e.g., bis (4-fluorophenoxy)—tetrakis (3-trifluoromethyl phenoxy) cyclotriphosphazene.

In accordance with alternative embodiments of the present invention, step (b) comprises applying the thin layer or film of a composite lubricant in the form of a single layer containing the at least one perfluoropolyether compound and the at least one phosphazene derivative, or step (b) comprises applying the thin layer or film of a composite lubricant in the form of separate sub-layers of the at least one perfluoropolyether compound and the at least one phosphazene derivative.

According to embodiments of the present invention, step (c) comprises treating the thin layer or film of composite lubricant solely with UV radiation from a source which principally supplies UV at energies below the threshold energy for photolytic generation of ozone ($O_3$); e.g., step (c) comprises supplying the UV radiation in the wavelength range from about 185 to about 254 nm, with about 70–80% of the radiation being at about 254 nm.

In accordance with further embodiments of the present invention, step (c) further comprises preventing contact of the thin layer or film of composite lubricant with oxygen ($O_2$) during the UV irradiation, whereby the photolytic generation of $O_3$ is further minimized or substantially prevented.

According to a particular embodiment of the present invention, the method forms part of a process for the manufacture of a data/information storage and retrieval medium, wherein:

step (a) comprises providing as the substrate a disk-shaped magnetic or magneto-optical ("MO") medium, wherein the substrate surface comprises a layer of a carbon (C)-based material;

step (b) comprises applying a thin layer or film of the composite lubricant to the substrate surface, the composite lubricant comprising at least one perfluoropolyether compound as a primary lubricant and at least one phosphazene derivative as a lubricant additive; and step (c) comprises treating the thin layer of composite lubricant solely with UV radiation from a source which principally supplies UV at energies below the threshold energy for photolytic generation of ozone ($O_3$), and further comprises preventing contact of the thin layer or film of composite lubricant with oxygen ($O_2$) during the UV irradiation, whereby the photolytic generation of $O_3$ is further minimized or substantially prevented.

Another aspect of the present invention is a data/information storage and retrieval medium, comprising:

(a) a substrate including a surface; and (b) a thin layer or film of an in situ stabilized composite lubricant on the substrate surface, comprising at least two normally mutually immiscible lubricant components treated solely with UV radiation to reduce or substantially eliminate phase separation thereof.

According to embodiments of the present invention, the substrate (a) is disk-shaped, comprises a layer stack including at least one magnetic or magneto-optical ("MO") recording layer, and the substrate surface comprises a layer of a carbon (C)-based material; and the thin layer or film (b) of stabilized composite lubricant on the substrate surface comprises at least one perfluoropolyether compound as a primary lubricant and at least one phosphazene derivative as a lubricant additive.

According to a particular embodiment of the present invention, the at least one phosphazene derivative comprises bis (4-fluorophenoxy)—tetrakis (3-trifluoromethyl phenoxy) cyclotriphosphazene.

In accordance with alternative embodiments of the present invention, the thin layer or film (b) of stabilized composite lubricant on the substrate surface is in the form of a single layer containing the at least one perfluoropolyether compound and the at least one phosphazene derivative; or the thin layer or film (b) of stabilized composite lubricant on the substrate surface is in the form of separate sub-layers of the at least one perfluoropolyether compound and the at least one phosphazene derivative.

According to a particular embodiment of the present invention, the sub-layer of the at least one perfluoropolyether compound is about 10–15 Å thick and the sub-layer of the at least one phosphazene derivative is up to about 5 Å thick.

Still another aspect of the present invention is a data/information storage and retrieval medium, comprising:

a substrate including a surface; and means for providing a stabilized composite lubricant layer on the substrate surface.

In accordance with an embodiment of the present invention, the substrate comprises a layer stack including at least one magnetic or magneto-optical ("MO") recording layer.

Additional advantages and aspects of the present invention will become readily apparent to those skilled in the art from the following detailed description, wherein embodiments of the present invention are shown and described, simply by illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein:

FIGS. 1(A)–1(C) are photomicrographs for illustrating the phase separation and effect of UV irradiation on phase separation/stabilization X-1P/Z-DOL composite lubricants on substrates comprising a carbon (C)-based surface layer;

FIGS. 2(A)–2(D) are photomicrographs for illustrating the effect of UV irradiation on prevention of phase separation of very thin X-1P/Z-DOL and X1P/Z-TETRAOL composite lubricant films with a high concentration of X-1P lubricant additive; and FIGS. 3(A)–3(B) are TOF-SIMS spectra of X-1P/Z-DOL composite lubricant films before and after UV irradiation, respectively.

DESCRIPTION OF THE INVENTION

The present invention is based upon the recognition that the above-described limitations and drawbacks associated with the use of composite lubricant compositions including at least one PFPE primary lubricant material and at least one cyclotriphosphazene-based lubricant additive in applying and forming lubricant topcoats in the manufacture of thin film magnetic and/or MO recording media, e.g., hard disks, arising from the mutual immiscibility of the at least one primary lubricant and the at least one lubricant additive, can be substantially avoided, or at least minimized, by performing an in situ stabilization process wherein a thin film of the composite lubricant applied (in a conventional manner) to the surface of a recording medium comprised of a laminate or stack of thin film layers is treated, i.e., stabilized against phase separation, as by treating the film solely with UV radiation. The inventive methodology differs in several significant respects from that of the prior art, as exemplified by the process disclosed in U.S. Pat. No. 6,099,762, described supra, in that stabilization of the composite lubricant film against phase separation of the at least one primary lubricant and at least one lubricant additive is a key feature of the present invention, which feature is in addition to the obtainment of any bonding of the lower portion of the lubricant film to the surface of the recording medium resulting from the UV irradiation. As a consequence, the process according to the invention advantageously facilitates formation of stable composite lubricant films containing a significantly increased amount of lubricant additive, e.g., X-1P, than is obtainable by the prior art. The inventive methodology thus differs from that of U.S. Pat. No. 6,099,762 in at least the following aspects:

(1) irradiation of the applied composite lubricant thin film according to the present invention is performed at ambient temperature, solely by means of a source of UV radiation. Stated differently, since according to the present invention, the lubricant thin film is not heated before, during, or after the treatment with UV, it is not exposed to IR irradiation prior to, simultaneously with, or subsequent to the UV irradiation;

(2) since, according to the present invention, it is desired that photolytic generation of ozone ($O_3$) at or near the lubricant thin film due to UV irradiation in an oxygen ($O_2$)-containing atmosphere be prevented, or at least minimized, a UV source is utilized which emits principally in the wavelength range above which $O_3$ is generated, e.g., by means of a UV source wherein >70% of the photons have a wavelength above about 185 nm. Stated differently, according to the present invention, a UV source is utilized which emits principally at about 254 nm; and (3) according to the invention, contact of the thin lubricant film with $O_2$ is substantially eliminated during irradiation thereof with UV, e.g. by purging $O_2$ from the treatment chamber containing the composite lubricant-coated workpiece, as by flowing a stream of an inert gas (e.g., nitrogen, $N_2$) thereover, in order to further reduce the likelihood of $O_3$ generation in the vicinity of the composite lubricant film.

According to the present invention, the primary lubricant material of the composite lubricant may comprise one or more PFPE compounds, available on the market under trade names such as FOMBLIN™ Z-DOL, Z-TETRAOL, Z-DOL TXS, AM 2001, and AM 3001 (Ausimont Montedison Group, Thorofare, N.J.), KRYTOX™ (DuPont Co., Delaware), and DEMNUM™ SA, SH, SP, and SY (Daikin Industries, Ltd., Osaka, Japan), and the lubricant additive may comprise one or more derivatives of cyclotriphosphazene, for example as described in U.S. Pat. Nos. 5,587,217; 5,718,942; 5,908,817; and 6,099,762 (the disclosures of which are incorporated herein by reference for all purposes), e.g., bis (4-fluorophenoxy)—tetrakis (3-trifluoromethyl phenoxy) cyclotriphosphazene (available as X-1P™ from Dow Chemical Co., Midland, Mich.). The composite lubricant may be applied to the surface of the uppermost layer (i.e., protective overcoat layer) of a layer stack or laminate forming part of a magnetic or MO recording medium, typically a carbon (C)-containing layer such as a diamond-like carbon ("DLC") layer, as a single layer by applying thereto a mixture of the at least one primary lubricant and at least one lubricant additive in combination with a suitable mutual solvent, e.g., a hydrocarbon or perfluorinated solvent, as described in U.S. Pat. No. 5,587, 217, or applied as separate sub-layers in a desired sequence. Application of the single or separate sub-layers may be performed by any standard technique, e.g., dipping, spraying, spin coating, etc., followed by drying to remove any volatile solvent(s) therefrom, and if desired, by tape burnishing.

For forming a single layer of composite lubricant of thickness from about 10 to about 40 Å (after drying for solvent removal), corresponding to a lubricant additive thickness of about 2 to about 25% of the total lubricant layer thickness, the concentration of the primary lubricant in the applied solution should be in the range from about 0.05 to about 1 wt. % and the concentration of the lubricant additive in the initially applied solution should be in the range from about 0.003 to about 0.067 wt. %.

When forming a composite lubricant film comprised of separate sub-layers of primary lubricant and lubricant additive, each sub-layer may be applied in a suitable thickness from respective solutions of suitable concentrations to yield, upon drying for solvent removal, a primary lubricant sub-layer having a thickness from about 10 to about 30 Å and a lubricant additive sub-layer having a thickness from about 0.5 to about 10 Å, e.g., 10–15 Å for the primary lubricant sub-layer and about 5 Å for the lubricant additive sub-layer.

According to the invention, the radiation source is selected to provide UV photons principally of energies below the threshold energy for production of ozone ($O_3$) from oxygen ($O_2$), i.e., wavelengths>about 185 nm, principally (i.e., at least about 70%) at about 254 nm, as by use of a low pressure Hg source. For maximum utility or productivity in continuous production processing, the source should preferably have an intensity sufficient to complete irradiation of the composite lubricant film in a minimum interval for a given amount of lubricant additive in the composite lubricant film, e.g., about 2–4 min. In order to further prevent or inhibit photolytic generation of $O_3$ in the vicinity of the composite lubricant film during UV irradiation thereof, the irradiation process is preferably performed within a chamber from which $O_2$ has been purged, as by flowing an inert gas (e.g., nitrogen, $N_2$) therethrough during irradiation.

EXAMPLE 1

An about 1 μm thick lubricant film of pure Z-DOL (a dihydroxy terminated perfluoropolyether, $HOCH_2$—$CF_2$—O—$(CF_2$—$CF_2$—$O)_p$—$(CF_2O)_q$—$CF_2$—$CH_2OH$) film was formed on the surface of a carbon (C)-containing protective overcoat layer of a magnetic recording ("MR") disk. No observable topographical features could be identified on the surface of the Z-DOL layer by means of optical microscopy at about 1,000×magnification. However, as is evident from the photomicrograph of FIG. 1(A), when a similar thickness composite lubricant film containing about 10 wt. % of X-1P [bis (4-fluorophenoxy)-tetrakis (3-trifluoromethyl phenoxy) cyclotriphosphazene] as a lubricant additive in Z-DOL primary lubricant was formed on a similar C-containing disk surface, severe phase separation was observed, wherein the X-1P segregated from the Z-DOL and formed droplets (i.e., "balling") on the surface of the Z-DOL film. As is similarly evident from FIGS. 1(B) and 1(C), however, the average size of the droplets decreases significantly (to the point of disappearance) when the composite lubricant films are irradiated with UV under conditions such as described supra, i.e., 2–4 min exposure to UV irradiation from a low pressure Hg source operating in the wavelength range 185 nm (15–20%) to 254 nm (70–80%), with concomitant $O_2$ purging by means of a flow of $N_2$. In addition, the total area of the X-1P droplets decreases with length of UV exposure.

EXAMPLE 2

It was further determined that the UV exposure, as described above, can stabilize much thinner composite lubricant films having a large concentration of lubricant additive, e.g., X-1P. Composite lubricant films comprised of an about 10–15 Å thick layer of a PFPE lubricant (such as Z-DOL and Z-TETRAOL) and an about 5 Å thick layer of a cyclotriphosphazene derivative (e.g., X-1P) on carbon (C)-containing disk surfaces were exposed to UV irradiation, as described supra, and then held at room temperature for about 4 weeks. As is evident from the photomicrographs of FIGS. 2(A) and 2(B), disks so treated exhibited no indication of X-1P phase separation, whereas, as is evident from the photomicrographs of FIGS. 2(C) and 2(D), phase separation of the X-1P lubricant additive is readily observed on similarly composite lubricant-coated disks not exposed to UV irradiation. Further in this regard, UV-treated composite lubricant-coated disks showed no evidence of phase separation even after extended exposure to aggressive environmental conditions, e.g., 2 days @ 30° C./80% RH.

While the exact mechanism of the performance enhancement, i.e., stabilization against phase separation of the primary lubricant and lubricant additive, provided by the present invention is nor known with certainty, and not wishing to be bound to any particular mechanism or theory, it is nonetheless clear or certain that chemical reactions involving at least the cyclotriphosphazene derivative of the lubricant additive occur during the UV irradiation. The characteristic bands of X-1P in Fourier transform infra-red spectroscopy ("FTIR") of X-1P/Z-DOL composite lubricant films are observed to partially disappear after UV exposure. Further, and with reference to FIGS. 3(A) and 3(B), the fragmentation pattern of X-1P in X-1P/Z-DOL composite lubricant films obtained by time-of-flight secondary ion mass spectroscopy ("TOF-SIMS") are also seen to partially disappear with exposure to UV radiation, noting that the peaks from 764 to 1052 are due to intact X-1P molecules with varying ratios of fluorophenol to trifluoromethylphenol substituents. However, X-ray spectroscopy ("XRS") indicates that the cyclotriphosphazene ring of the X-1P molecule has neither desorbed nor decomposed. It is therefore believed that the UV irradiation effects chemical modification of the fluorophenol and trifluoromethylphenol substituents of the cyclotriphosphazene ring, and these reactions result in improved compatibility between the X-1P lubricant additive and the primary PFPE lubricant on the carbon (C)-containing protective overcoat.

The present invention thus provides a number of advantages over conventional methodology utilizing composite lubricant films, including the formation of stable composite lubricant films containing a significantly greater amount of lubricant additive, e.g., X-1P, than are obtainable according to the conventional art, and is of particular utility in automated manufacturing processing of thin film magnetic and MO recording media requiring formation of stable lubricant topcoat layers for obtaining improved tribological properties. Specifically, the present invention provides for stabilization against phase separation of composite lubricant films comprised of at least one PFPE primary lubricant and an increased amount of at least one lubricant additive comprised of a cyclotriphospazene derivative. Further, the inventive methodology can be readily practiced and utilized as part of conventional recording media manufacturing technology in view of its full compatibility with all other aspects of automated manufacture of disk-shaped magnetic and MO media. Finally, the inventive methodology is broadly applicable to the manufacture of a number of different products, e.g., mechanical parts, gears, linkages, etc., requiring lubrication.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A method of performing in situ stabilization of a composite lubricant in order to reduce or substantially eliminate phase separation of the components of said composite lubricant, which method comprises the sequential steps of:
   (a) providing a substrate including a surface;
   (b) applying a thin layer or film of said composite lubricant to said substrate surface, said composite lubricant comprising at least two lubricant components which are normally mutually immiscible; and
   (c) treating said thin layer or film of composite lubricant solely with UV radiation for an interval sufficient to reduce or substantially eliminate phase separation of said at least two normally mutually immiscible lubricant components.

2. The method as in claim 1, wherein:
step (a) comprises providing a data/information storage and retrieval medium as said substrate.

3. The method as in claim 2, wherein:
step (a) comprises providing a disk-shaped magnetic or magneto-optical ("MO") medium as said substrate.

4. The method as in claim 3, wherein:
step (a) comprises providing a magnetic or MO medium as said substrate, wherein said substrate surface comprises a layer of a carbon (C)-based material.

5. The method as in claim 1, wherein:
step (b) comprises applying a thin layer or film of a composite lubricant comprising at least one perfluoropolyether compound as a primary lubricant and at least one phosphazene derivative as a lubricant additive.

6. The method as in claim 5, wherein:
step (b) comprises applying a thin layer or film of a composite lubricant comprising bis (4-fluorophenoxy)—tetrakis (3-trifluoromethyl phenoxy) cyclo-triphosphazene as said at least one lubricant additive.

7. The method as in claim 5, wherein:
step (b) comprises applying said thin layer or film of a composite lubricant in the form of a single layer containing said at least one perfluoropolyether compound and said at least one phosphazene derivative.

8. The method as in claim 5, wherein:
step (b) comprises applying said thin layer or film of a composite lubricant in the form of separate sub-layers of said at least one perfluoropolyether compound and said at least one phosphazene derivative.

9. The method as in claim 1, wherein:
step (c) comprises treating said thin layer or film of composite lubricant solely with UV radiation from a source which principally supplies UV at energies below the threshold energy for photolytic generation of ozone ($O_3$).

10. The method as in claim 9, wherein:
step (c) comprises supplying said UV radiation in the wavelength range from about 185 to about 254 nm, with about 70–80% of said radiation being at about 254 nm.

11. The method as in claim 9, wherein:
step (c) further comprises preventing contact of said thin layer or film of composite lubricant with oxygen ($O_2$) during said treatment with UV radiation, whereby said photolytic generation of $O_3$ is further minimized or substantially prevented.

12. The method as in claim 1, forming part of a process for the manufacture of a data/information storage and retrieval medium, wherein:

step (a) comprises providing as said substrate a disk-shaped magnetic or magneto-optical ("MO") medium, wherein said substrate surface comprises a layer of a carbon (C)-based material;

step (b) comprises applying a thin layer or film of said composite lubricant to said substrate surface, said composite lubricant comprising at least one perfluoropolyether compound as a primary lubricant and at least one phosphazene derivative as a lubricant additive; and step (c) comprises treating said thin layer of composite lubricant solely with UV radiation from a source which principally supplies UV at energies below the threshold energy for photolytic generation of ozone ($O_3$), and further comprises preventing contact of said thin layer or film of composite lubricant with oxygen ($O_2$) during said treatment with UV radiation, whereby said photolytic generation of $O_3$ is further minimized or substantially prevented.

13. A data/information storage and retrieval medium, comprising:

(a) a substrate including a surface; and (b) a thin layer or film of an in situ stabilized composite lubricant on said substrate surface, comprising at least two normally mutually immiscible lubricant components treated solely with UV radiation to reduce or substantially eliminate phase separation thereof.

14. The medium according to claim 13, wherein:

said substrate (a) is disk-shaped, comprises a layer stack including at least one magnetic or magneto-optical ("MO") recording layer, and said substrate surface comprises a layer of a carbon (C)-based material; and said thin layer or film (b) of stabilized composite lubricant on said substrate surface comprises at least one perfluoropolyether compound as a primary lubricant and at least one phosphazene derivative as a lubricant additive.

15. The medium according to claim 14, wherein:

said at least one phosphazene derivative comprises bis (4-fluorophenoxy)—tetrakis (3-trifluoromethyl phenoxy) cyclotriphosphazene.

16. The medium according to claim 14, wherein:

said thin layer or film (b) of stabilized composite lubricant on said substrate surface is in the form of a single layer containing said at least one perfluoropolyether compound and said at least one phosphazene derivative.

17. The medium according to claim 14, wherein:

said thin layer or film (b) of stabilized composite lubricant on said substrate surface is in the form of separate sub-layers of said at least one perfluoropolyether compound and said at least one phosphazene derivative.

18. The medium according to claim 17, wherein:

said sub-layer of said at least one perfluoropolyether compound is about 10–15 Å thick and said sub-layer of said at least one phosphazene derivative is about 5 Å thick.

* * * * *